US012344515B2

(12) United States Patent
Lang et al.

(10) Patent No.: US 12,344,515 B2
(45) Date of Patent: Jul. 1, 2025

(54) DRIVERLESS TRANSPORT VEHICLE HAVING A PAYLOAD LIFTING APPARATUS AND SECURING APPARATUS

(71) Applicant: Continental Automotive Technologies GmbH, Hannover (DE)

(72) Inventors: Stefan Lang, Rheinböllen (DE); Sven Mainz, Hofheim am Taunus (DE); Sascha Gerber, Bad Schwalbach (DE)

(73) Assignee: Continental Automotive Technologies GmbH, Hannover (DE)

(*) Notice: Subject to any disclaimer, the term of this patent is extended or adjusted under 35 U.S.C. 154(b) by 276 days.

(21) Appl. No.: 17/999,388

(22) PCT Filed: May 10, 2021

(86) PCT No.: PCT/DE2021/200064
§ 371 (c)(1),
(2) Date: Nov. 18, 2022

(87) PCT Pub. No.: WO2021/233507
PCT Pub. Date: Nov. 25, 2021

(65) Prior Publication Data

US 2023/0202812 A1 Jun. 29, 2023

(30) Foreign Application Priority Data

May 19, 2020 (DE) ..................... 10 2020 206 304.4

(51) Int. Cl.
*B66F 9/18* (2006.01)
*B66F 9/06* (2006.01)
(Continued)

(52) U.S. Cl.
CPC .............. *B66F 9/063* (2013.01); *B66F 9/061* (2013.01); *B66F 9/065* (2013.01); *B66F 9/18* (2013.01); *B66F 9/24* (2013.01)

(58) Field of Classification Search
CPC ........................................................ B66F 9/18
See application file for complete search history.

(56) References Cited

U.S. PATENT DOCUMENTS 5,647,644 A 7/1997 Volz
7,402,018 B2 7/2008 Mountz
(Continued)

FOREIGN PATENT DOCUMENTS

CN 205820809 U 12/2016
CN 107082094 A 8/2017
(Continued)

OTHER PUBLICATIONS

German Search Report dated Feb. 8, 2021 for the counterpart German Patent Application No. 10 2020 206 304.4.
(Continued)

*Primary Examiner* — Mark C Hageman

(57) ABSTRACT

A driverless automatically guided transport vehicle for conveying payloads, for example a material transport vehicle in a factory, having a payload lifting apparatus. In order to offer a transport vehicle which is improved with regard to the securing of loads, it is proposed that the transport vehicle has a retaining apparatus for securing the load on the transport vehicle, the activation of which retaining apparatus is positively coupled to the lifting movement of the lifting apparatus.

10 Claims, 3 Drawing Sheets a)

b)

(51) Int. Cl.
*B66F 9/065* (2006.01)
*B66F 9/24* (2006.01)

(56) References Cited

U.S. PATENT DOCUMENTS

| | | | | |
|---|---|---|---|---|
| 2006/0210382 | A1 | 9/2006 | Mountz et al. | |
| 2016/0167557 | A1 | 6/2016 | Mecklinger | |
| 2023/0052440 | A1 * | 2/2023 | Hansen | B66F 9/07522 |

FOREIGN PATENT DOCUMENTS

| | | | |
|---|---|---|---|
| CN | 108751054 | A | 11/2018 |
| CN | 110482442 | A | 11/2019 |
| CN | 110615218 | A | 12/2019 |
| CN | 110884517 | A | 3/2020 |
| DE | 102013013438 | A1 | 2/2015 |
| DE | 102015002495 | A1 | 9/2016 |
| DE | 102016107451 | A1 | 10/2016 |
| DE | 202019003416 | U1 | 8/2019 |
| EP | 0102706 | A1 | 3/1984 |
| EP | 3385144 | A1 | 10/2018 |
| JP | H05221516 | A | 8/1993 |
| JP | 3093419 | U | 5/2003 |
| JP | 2005187120 | A | 7/2005 |
| JP | 2008515744 | A | 5/2008 |
| JP | 2018034932 | A | 3/2018 |
| KR | 200405941 | | 1/2006 |
| KR | 20070115391 | A | 12/2007 |
| KR | 20130098799 | A | 9/2013 |
| KR | 101622146 | B1 | 5/2016 |
| WO | 2014118716 | A2 | 8/2014 |

OTHER PUBLICATIONS

The International Search Report and the Written Opinion of the International Searching Authority mailed on Aug. 20, 2021 for the counterpart PCT Application No. PCT/DE2021/200064.
Notice of Reasons for Refusal drafted Sep. 25, 2023 for the counterpart Japanese Patent Application No. 2022-562738 and translation of same.
Notice of Allowance drafted Nov. 16, 2023 for the counterpart Japanese Patent Application No. 2022-562738 and translation of same.
Korean Office Action dated Oct. 31, 2023 for the counterpart Korean Patent Application No. 10-2022-7015927 and translation of same.
Korean Office Action dated Nov. 7, 2024 for the counterpart Korean Patent Application No. 10 2022 7035714 and machine translation of same.
Chinese First Office Action dated Jan. 15, 2025 for the counterpart Chinese Patent Application No. 202180030610.4 and machine translation of same.

* cited by examiner a)

b)

a)

b)

DRIVERLESS TRANSPORT VEHICLE HAVING A PAYLOAD LIFTING APPARATUS AND SECURING APPARATUS

CROSS-REFERENCE TO RELATED APPLICATIONS

The present application is a National Stage Application under 35 U.S.C. § 371 of International Patent Application No. PCT/DE2021/200064 filed on May 10, 2021, and claims priority from German Patent Application No. 10 2020 206 304.4 filed on May 19, 2020, in the German Patent and Trademark Office, the disclosures of which are herein incorporated by reference in their entireties.

TECHNICAL FIELD

The invention relates to a driverless automatically guided transport vehicle for conveying payloads.

BACKGROUND

Transport vehicles are normally used as so-called industrial trucks or material transport vehicles in production factories, for example for transporting particular payloads in the warehouse or from the warehouse to the production line, whilst preferably navigating autonomously. In the case of such transport vehicles, the load may be composed both of the payload itself and of a payload carrier that can be separately loaded with the payload—for example a rack, a roller trolley or the like. Here, it is the intention that the transport vehicle can travel under such a payload carrier, independently lift said payload carrier, transport said payload carrier to the destination, and set said payload carrier down again there. For this purpose, the transport vehicle is equipped with an integrated lifting apparatus.

With regard to the relevant prior art, reference is made by way of example to DE 102013013438 A1 or EP 102706 A1.

In the case of known transport vehicles, the load is held merely in force-fitting fashion by way of friction between the one or more corresponding load carrier elements on the transport vehicle and the payload carrier. For regular traveling operation, this is considered to be adequate owing to relatively low acceleration and transverse forces.

However, if the load becomes caught on an obstruction, for example on an object that is projecting into the traveling route, the load can slip or fall off.

SUMMARY

A transport vehicle is equipped with a retaining apparatus which, by way of a mechanical form fit, prevents an undesired movement of the load on the transport vehicle. Here, the activation of the retaining apparatus is positively coupled to the lifting movement of the lifting apparatus, such that a malfunction is ruled out.

Here, the activation of the retaining apparatus is implemented by way of a structurally designed profiled track.

The retaining apparatus may have a locking fork that can be moved from a retracted parked position into a deployed locking position. Here, in the deployed locking position, said locking fork engages around a traverse, which is attached to the payload or to a separate payload carrier, at at least two opposite sides, whereby an effective and robust form-fitting securing action is effected and maintained during transport.

In order to realize a construction of the transport vehicle which is compact and favorable in terms of maintenance, said transport vehicle has a flat chassis with drive components arranged therein, and has at least one load carrier element which is height-adjustable relative to the chassis and which serves for carrying the payload. Here, the locking fork of the lifting apparatus is arranged in a protected and space-saving manner substantially in a gap between the chassis and the load carrier element.

In an embodiment, for a stable and at the same time weight-saving construction, the transport vehicle has two load carrier elements and two locking forks, which are arranged in each case oppositely on both sides of the chassis.

In a refinement, the lifting apparatus has a lifting shaft, the rotation of which is positively coupled to the lifting movement of the load carrier element.

A further refinement provides for the lifting apparatus to have a control cam which co-rotates with the lifting shaft and which extends radially outward with respect to the lifting shaft. The locking fork simultaneously forms a structurally designed profiled track by way of a separately formed profiled portion. In order to lift the locking fork from its retracted parked position into the deployed locking position, the control cam that co-rotates with the lifting shaft slides on the profiled track and thus positively activates the retaining apparatus in a trouble-free manner.

In one embodiment, that end of the control cam which slides on the locking fork has a convex tip and a flattened or concave section. During the lifting operation, the tip slides along the profiled track so as to form a low-friction linear contact point, whereas, in the deployed locking position, the section lies flat against a corresponding plateau provided within the profiled track. Along with low-friction operation, this simultaneously also realizes a stable rest position for the admission and introduction of high retaining forces from the load of the transport vehicle into the chassis.

For a space-saving construction, an embodiment provides for the locking fork, in the retracted parked position, to engage around the lifting shaft radially at the outside at least in certain portions.

According to one embodiment the lifting shaft is actuated by a wraparound drive.

The present invention will be discussed in more detail below on the basis of an exemplary embodiment.

DETAILED DESCRIPTION

Figure 1:
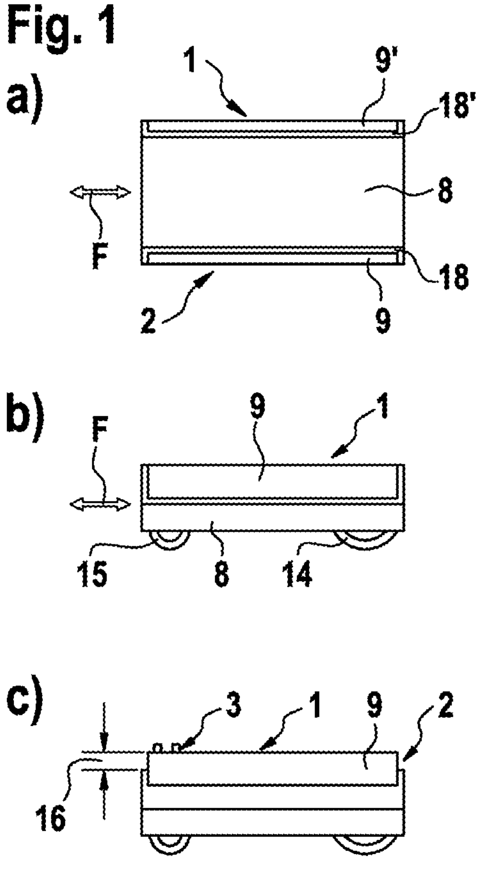
FIG. 1 is a simplified illustration of the transport vehicle in a plan view (view a) and side views with a retracted (b) and deployed (c) lifting apparatus

The driverless transport vehicle 1 serves for conveying payloads on smooth floors in production and assembly factories, for example for the purposes of transporting parts and components from and to the production line or in the parts warehouse. The transport vehicle 1 selects its traveling route autonomously on the basis of integrated space monitoring sensors and a control system, which are however not accentuated here and are not illustrated.

The transport vehicle 1 has a flat, compact chassis 8, in and on which all control and drive components are arranged.

The transport vehicle 1 moves on a pair of support wheels 15 and a pair of drive wheels 14. The drive wheels 14 are driveable individually, independently of one another, and thus serve both for the propulsion and for the steering of the transport vehicle 1.

For carrying the load or for the placement of the load, the transport vehicle 1 has two load carrier elements 9, 9', which form a constituent part of a lifting apparatus 2. The load carrier elements 9, 9' are of elongate form in a longitudinal direction or parallel to the direction of travel F and laterally flank the chassis 8 in the upper region, forming in each case one gap 18, 18'. In the embodiment shown, each load carrier element 9, 9' is configured as a box-like hollow body. To lift the load, the load carrier elements 9, 9' can be lifted in a vertical lifting direction H by a lift travel 16 from a retracted parked position (view b) into a deployed transport position.

In order to secure the load on the transport vehicle 1 during travel, a separate retaining apparatus 3 is provided. In the activated state, this provides multiple stable projections which project in the lifting direction H beyond the two load carrier elements 9, 9'. In this way, a type of stop or form fit for the load of the transport vehicle 1 is formed, which prevents the load from slipping. The activation of the retaining apparatus 3 is positively mechanically coupled to the lifting movement of the lifting apparatus 2, as described by way of FIG. 5.

Figure 2:
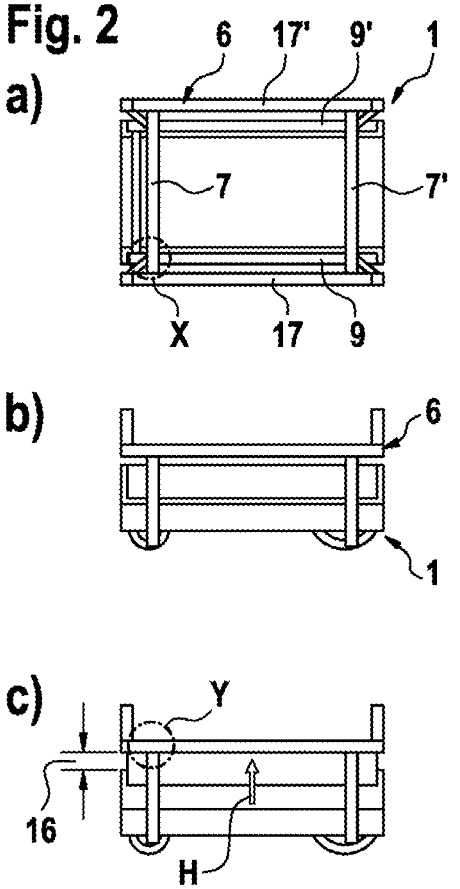
FIG. 2 shows views as per FIG. 1, but additionally with a payload carrier.

The transport vehicle 1 is designed for transporting payloads in a separate payload carrier 6, shown in FIG. 2. The payload carrier 6 may be constructed in a variety of forms, e.g. in the form of a rack as shown, in the form of a trolley or roller trolley, or the like.

The payload carrier 6 is constructed such that the transport vehicle 1 with load carrier elements 9, 9' in the parked position can travel under the payload carrier 6. The payload carrier 6 has two traverses 7, 7' which run transversely with respect to the direction of travel and on which the load carrier elements are supported during the lifting and transporting of the payload carrier 6. In the embodiment shown, the traverses 7, 7' are connected by way of two externally situated longitudinal members 17, 17'.

To transport the load, the transport vehicle 1 travels under the payload carrier 6 and activates the lifting apparatus 2. Here, the load carrier elements 9, 9' are lifted in the lifting direction H, abut against the traverses 7, 7' in the process, and lift the payload carrier 6 from the floor. The payload carrier 6 can thereupon be transported to the destination, and set down on the floor again there in the reverse sequence.

During the lifting of the load carrier elements 9, 9', the retaining apparatus 3 is automatically activated. Said retaining apparatus has a locking fork 5 illustrated in detail in FIG. 5. When the retaining apparatus 3 is activated, the locking fork 5 is moved from a retracted parked position into a deployed locking position, where it engages around the traverse 7 at two opposite sides in the direction of travel F and thereby secures said traverse in form-fitting fashion.

Figure 4:
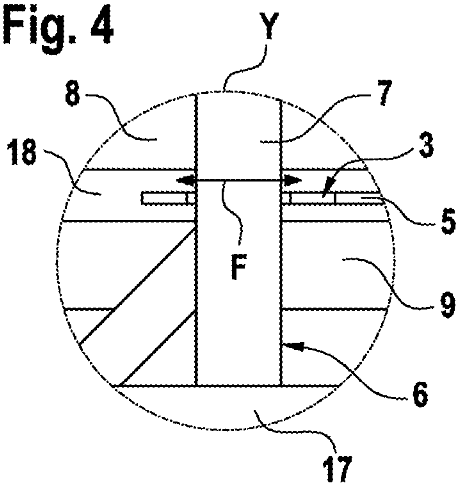
FIG. 4 shows a simplified and enlarged partial view of the retaining apparatus in a plan view.

FIG. 4, shows the locking fork 5 is of flat design, for example cut or punched out of a steel plate in a simple and inexpensive manner. The locking forks 5 are substantially situated in space-saving fashion in the gap 18 between the chassis 8 and the load carrier element 9. On the opposite side of the transport vehicle 1, a second locking fork 5' of equivalent construction and function is situated in the gap 18', in a manner which is not shown here.

Figure 5:
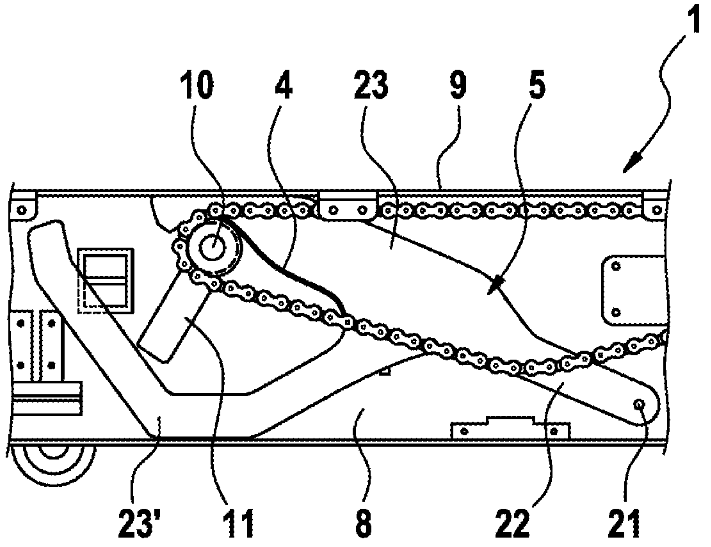
FIG. 5 shows side views of an embodiment of the retaining apparatus in the retracted parked position (a) and in the deployed locking position (b).
Figure 5:
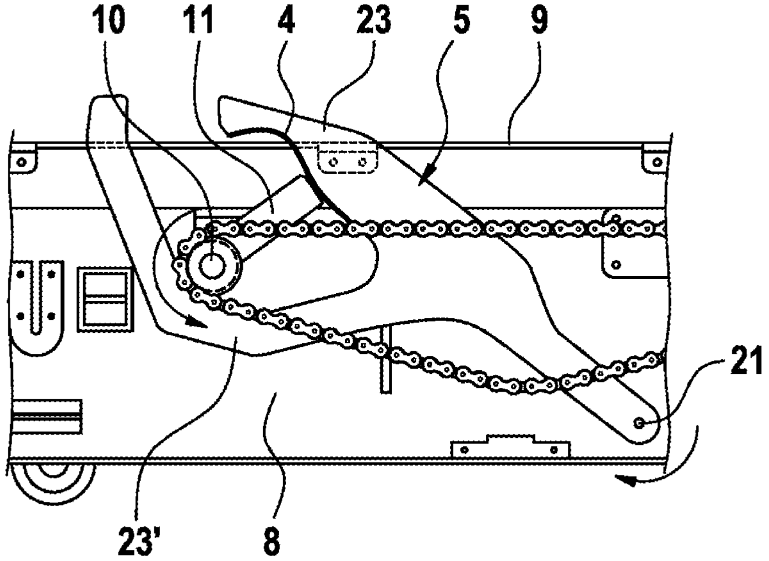

FIG. 5 shows a partial lateral view of the transport vehicle 1, with a side wall of the load carrier element 9 having been removed.

In the view a), the locking fork 5 is illustrated in its retracted parked position. Said locking fork is in this case situated entirely within the side profile of the chassis 8, below the upper rail of the load carrier element 9. The locking fork 5 has substantially one load-bearing arm 22 and two holding arms 23, 23'. With the load-bearing arm 22, the locking fork 5 is supported and fastened rotatably in the lower region of the chassis 8 at a rotary bearing 21. The two holding arms 23, 23' encompass a lifting shaft 10 radially at the outside. The lifting shaft 10 is a constituent part of the lifting apparatus 3, and a rotation of the lifting shaft 10 is coupled by means of a transmission mechanism (not illustrated here) to the lifting movement of the load carrier element 9. When the lifting shaft 10 rotates, the load carrier element 9 is lifted and lowered.

Projecting radially outward from the lifting shaft 10 is a rotationally conjointly fixed control cam 11, which positively co-rotates with the lifting shaft 10. On its holding arm 23 which is the upper holding arm in the parked position, the locking fork 5 has a separately profiled portion which faces toward the lifting shaft 10 and which functions as a profiled track 4 for the control of the locking fork 5. When the lifting shaft 10 rotates for the purposes of lifting the load carrier element 9, the control cam 11 slides on the profiled track 4 and, in so doing, positively lifts the locking fork 5 from the retracted parked position into the deployed locking position, as illustrated in the view b).

Figure 3:
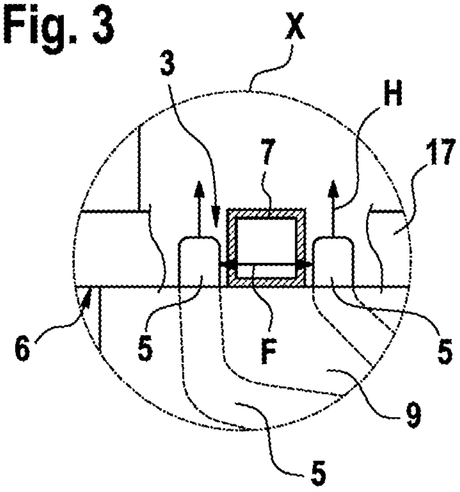
FIG. 3 shows a simplified and enlarged partial view of the retaining apparatus in a side view.

Here, the tips of the two holding arms 23, 23' are lifted in a vertical direction above the level of the upper rail of the load carrier element 9, and thus form the stops or a form fit for the traverse 7 of the payload carrier 6, as already described in FIG. 3.

For the lowering of the load carrier element 9, the lifting shaft 10 rotates further, such that the control cam 11 departs from the profiled track 4 and no longer supports the holding arm 23, whereupon the locking fork 5 automatically falls into its retracted parked position as per view a).

Figure 6:
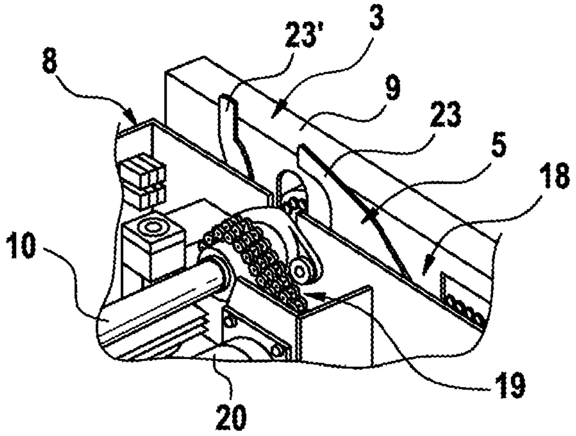
FIG. 6 shows three-dimensional partial views of the retaining apparatus without (a) and with (b) the payload carrier.
Figure 6:
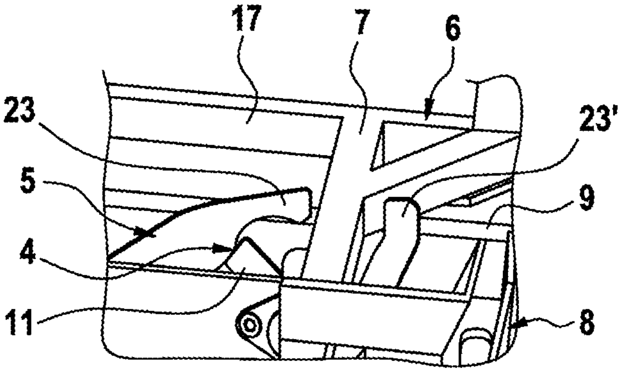

FIG. 6 illustrates, in a three-dimensional partial view, the arrangement of the locking fork 5 in the gap 18 between the load carrier element 9 and the chassis 8. Here, the retaining apparatus 3 is illustrated in its activated state, with the locking fork 5 in the locking position and the load carrier element 9 in its lifted transport position.

Also visible is a simple and robust actuation of the lifting shaft 10 by means of a wraparound drive 19, which is activated by an electromotive drive unit 20. In the embodiment shown, the wraparound drive 19 is provided as a chain drive. There may however be some other configuration, for example in the form of a belt drive, depending on requirements.

Figure 7:
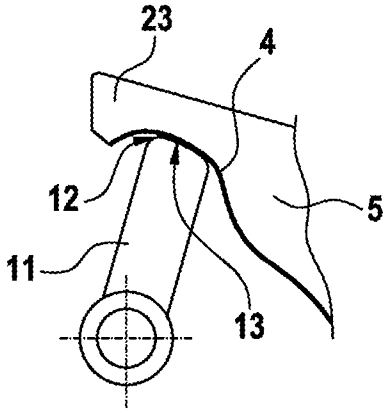
FIG. 7 shows an enlarged view of the control cam with the locking fork in the locking position in the embodiment as per FIG. 5.

FIG. 7 shows, in a detail view, a first embodiment of the control cam 11 according to the embodiments shown above.

That end of the control cam 11 which slides on the locking fork 5 has a convex or rounded tip 12, and a flattened section 13 which directly follows and adjoins the tip 12 and which is inclined counter to the direction of rotation. During the lifting operation, the tip 12 slides on the profiled track 4, so as to form a low-friction linear contact point. In the locking position illustrated here, the section 13 lies flat against a corresponding plateau within the profiled track 4, in a region of a stable equilibrium in the sense of a local minimum of a circumferential force which, as the control cam 11 rotates, is exerted on the latter by the locking fork 5.

Figure 8:
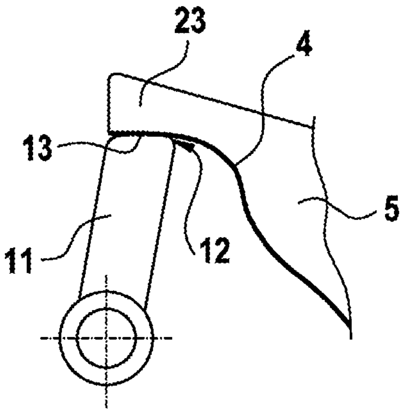
FIG. 8 shows an enlarged view of the control cam with the locking fork in the locking position in another embodiment.

FIG. 8 shows another embodiment of the control cam 11. By contrast to the embodiment described above, the section 13 is inclined in the direction of rotation, and is formed ahead of the tip 12. The corresponding flattened plateau in the profiled track 4 is situated on one side in the holding arm 23 of the locking fork 5. The operating principle however remains equivalent to the embodiment as per FIG. 7.

For both embodiments, the section 13 may also be of concave form, and the corresponding profiled track region of convex form, in order to increase the stability of the equilibrium position.

The invention claimed is:

1. A driverless automatically guided transport vehicle for transporting a load comprising:

a lifting apparatus which is configured to lift the load such that said load can be transported in the lifted state;

a retaining apparatus for securing the load on the transport vehicle, wherein the activation of the retaining apparatus is positively coupled to the lifting movement of the lifting apparatus; and wherein the retaining apparatus has a locking fork which can be moved from a retracted parked position into a deployed locking position and which in the deployed position engages around a traverse, which is attached to the payload or to a separate payload carrier, at at least two opposite sides and thus secures said traverse in form-fitting fashion.

2. The transport vehicle as claimed in claim 1, wherein the coupling is implemented by mechanical means.

3. The transport vehicle as claimed in claim 2, wherein the activation of the retaining apparatus is performed in track-controlled fashion by way of a profiled track.

4. The transport vehicle as claimed in claim 1, wherein the transport vehicle has a chassis with drive components arranged therein, and the lifting apparatus comprises at least one load carrier element which is height-adjustable relative to the chassis and which serves for carrying the payload, and wherein the locking fork is at least partially arranged in a gap between the chassis and the load carrier element.

5. The transport vehicle as claimed in claim 4, wherein the transport vehicle has two load carrier elements and two locking forks, which are arranged in each case oppositely on both sides of the chassis.

6. The transport vehicle as claimed in claim 4, wherein the lifting apparatus has a lifting shaft, the rotation of which is coupled to the lifting movement of the load carrier element.

7. The transport vehicle as claimed in claim 6, wherein the lifting apparatus has a control cam which co-rotates with the lifting shaft and which extends radially outward with respect to the lifting shaft, wherein the locking fork, in one portion thereof, forms a profiled track such that the control cam, by sliding on the profiled track, moves the locking fork at least from the retracted parked position into the deployed locking position.

8. The transport vehicle as claimed in claim 7, wherein that end of the control cam which slides on the locking fork has a convex tip and a flattened or concave section, wherein, during the lifting operation, the tip slides on the profiled track, forming a linear contact point, and, in the deployed locking position, the section bears against the locking fork.

9. The transport vehicle as claimed in claim 6, wherein the locking fork, in the retracted parked position, engages around the lifting shaft radially at the outside at least in certain portions.

10. The transport vehicle as claimed in claim 6, wherein the lifting shaft is actuated by way of a wraparound drive.

* * * * *